July 27, 1965  K. SENDLER  3,197,775
DOPPLER TRACKING SYSTEM WITH REAL TIME PRESENTATION
OF MISSILE TRAJECTORY DEVIATION
Filed Nov. 9, 1964  4 Sheets-Sheet 1
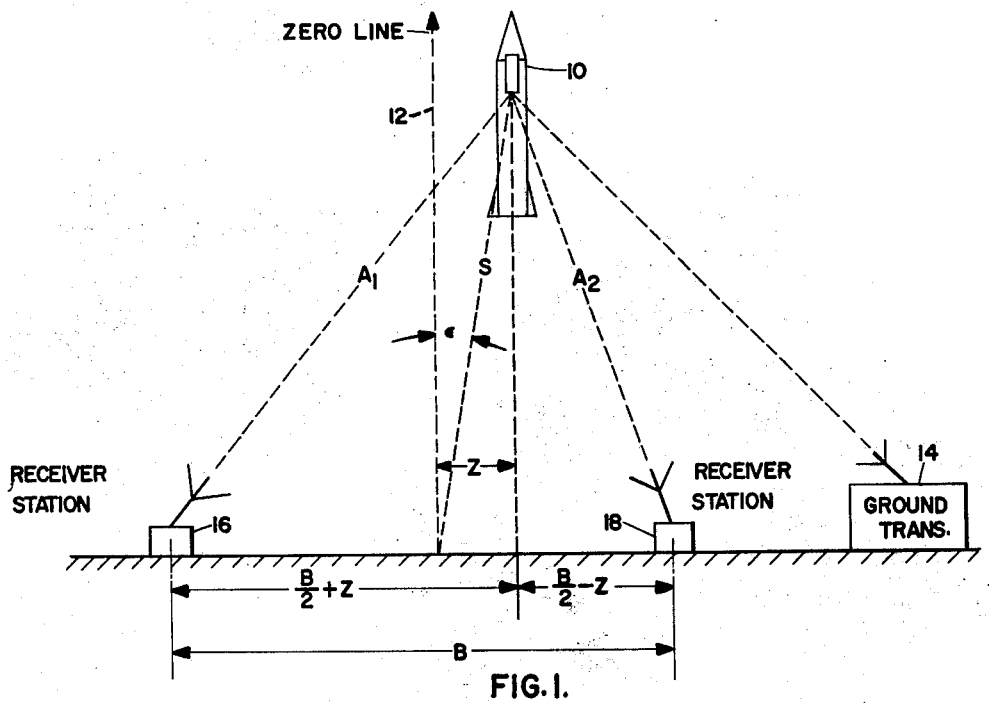
FIG. I.
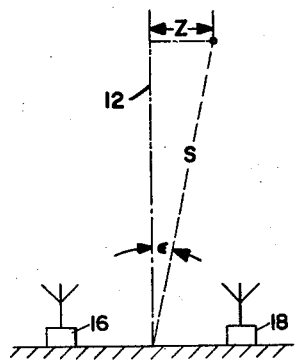
FIG. 2.
Karl Sendler,
INVENTOR.
BY
ATTORNEYS.

3,197,775
DOPPLER TRACKING SYSTEM WITH REAL TIME PRESENTATION OF MISSILE TRAJECTORY DEVIATION
Karl Sendler, Cocoa Beach, Fla., assignor to the United States of America as represented by the Secretary of the Army
Filed Nov. 9, 1964, Ser. No. 411,674
2 Claims. (Cl. 343—15)
(Granted under Title 35, U.S. Code (1952), sec. 266)

The invention described herein may be manufactured and used by or for the Government for governmental purposes without the payment of any royalty thereon.

This application is a continuation-in-part of application Serial Number 40,976 filed July 5, 1960 now abandoned.

This invention relates in general to object location systems and in particular to systems for determining the direction in space of a distant moving object relative to a selected position.

In many types of measurement or control operations it is desirable to have relatively simple and reliable equipment capable of providing an accurate indication of the direction in space of a distant moving object relative to a ground location. A typical illustration of such an instance would be the measurement of the flight of a missile.

A radar type system is capable of providing location indication, however, complete radar systems capable of accurate angular determinations are inherently complex and require bulky and expensive antennas.

It is accordingly an object of the present invention to provide a location system of inherently simple structure which is capable of highly accurate angular determinations.

Another object of the present invention is to provide a system for determining the angular relation of an object in space with respect to a reference position which does not require a complex antenna system.

Figure 3:
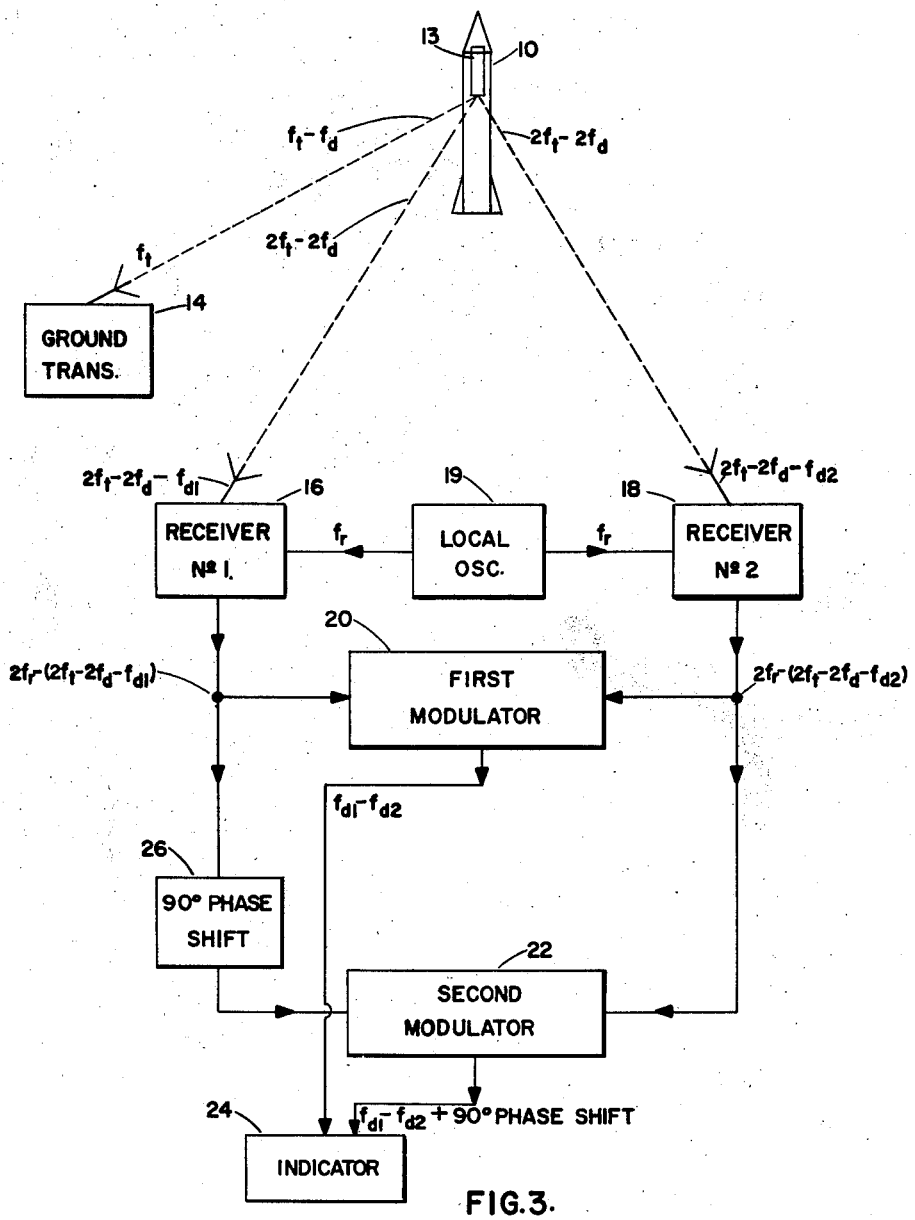
Figure 4:
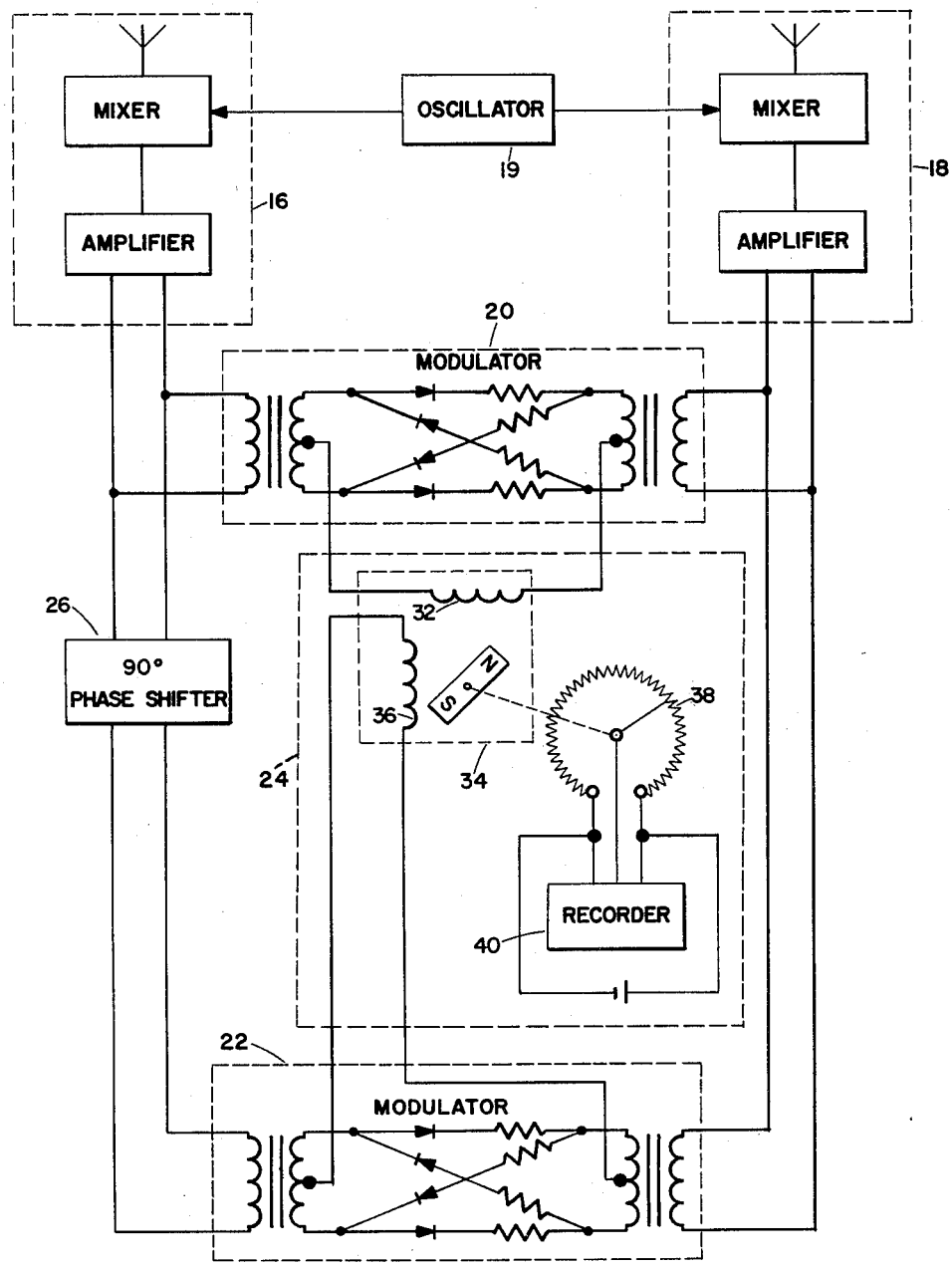
Figure 5:
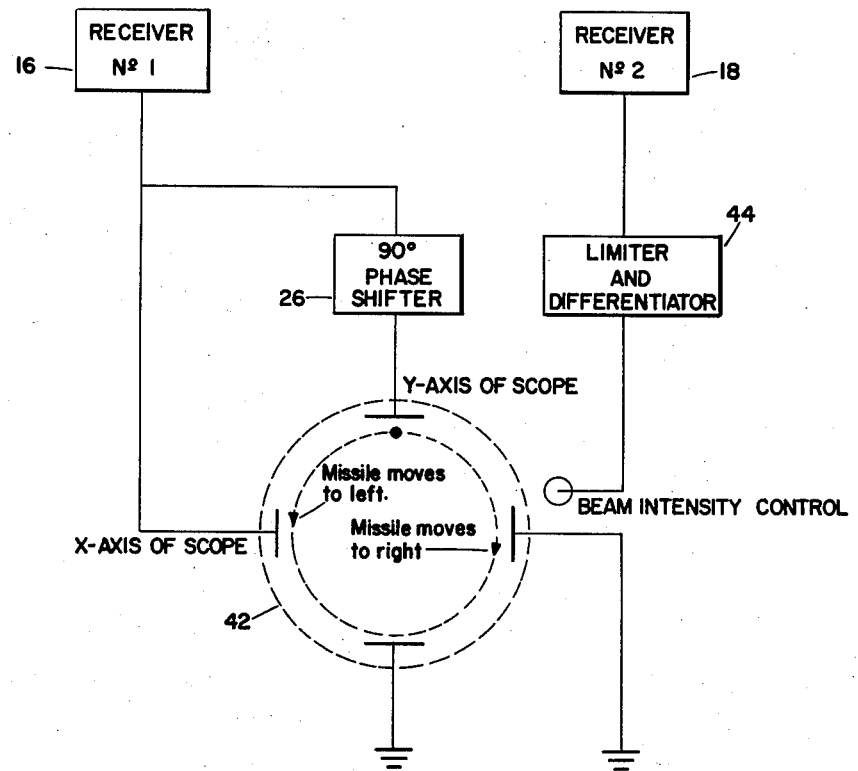

Other objects and features of the present invention will become apparent upon consideration of the following description and accompanying drawings, wherein, FIGURES 1 and 2 illustrate the measurement parameters with which the invention is concerned and show broadly the arrangement of components contemplated by an embodiment of the invention;

FIGURE 3 shows in block diagram form the electrical arrangement of an embodiment of the invention; and FIGURES 4 and 5 show circuit diagrams illustrating embodiments of the indicator portions of the invention.

In accordance with the invention and as illustrated in FIGURE 1, first and second signal receiving stations 16 and 18 are positioned on a bass line B which is perpendicular to the course or line of desired trajectory 12 of an object to be observed. The stations also are positioned on opposite sides of and equal distances from the desired course of the object. Means are provided, active or reflective, to transmit a signal from the object, which signal is received by the receiving stations. The relative frequency of the two doppler effected received signals is obtained, the difference in frequency indicating the rate of angular departure from the course (angular velocity of the course line as rotated about the intersection of the base and course lines) and the direction of departure being indicated by the received signal which is higher in frequency.

The magnitude of movement from the course line, total angular change, is obtained by counting and totaling the cycles of the difference frequency which occur. To accomplish this measurement, the received signals are fed to two frequency difference taking circuits and the difference outputs employed to provide first and second inputs to drive a synchronous motor indicating means. The phase of one of the inputs to one of the difference taking circuits is shifted 90°. The rate of turn of the motor represents the angular velocity of the object and the angle by which the object has departed from the desired trajectory is indicated by the magnitude of rotation of the motor which may be calibrated (as by gear arrangement) to indicate over a desired range of deviation.

To examine the problem solved by the invention in greater detail reference is made to FIGURES 1 and 2. Considering first FIGURE 1, it is to be noted that when the observed object, such as a missile, remains over the zero line, the Doppler beat frequency at each station is exactly the same. When the missile deviates to the left or right, one beat frequency will increase and the other will decrease. The difference between these two beats, or the "Beat-Beat," is as indicated above, the lateral angular velocity. The total number of cycles of the difference frequency, $\Delta F = \int (f_1 - f_2) dt$, is an indication of the lateral angular displacement where $f_1$ and $f_2$ represent the two received signals.

From FIGURE 1 it is determined that:

$$A_1^2 - \left(\frac{B}{2} + z\right)^2 = A_2^2 - \left(\frac{B}{2} - z\right)^2$$

$$z = \frac{A_1^2 - A_2^2}{2B}$$

$$= \frac{(A_1 - A_2)(A_1 + A_2)}{2B}$$

As illustrated in FIGURE 1, B is the distance between the two receivers, $A_1$ and $A_2$ are the respective distances from the receiving stations to the missile and $z$ is the lateral displacement. As $A_1$ and $A_2$ are made much larger than B, these distances are both very close to the slant range, S, (FIGURE 2), and thus for practical purposes here, $A_1 + A_2 = 2S$. Therefore, $$z = \frac{(A_1 - A_2)S}{B}$$

The difference in distance from the missile to the two stations, $A_1 - A_2$, is equal to the total Beat-Beat cycle count, $\Delta F$, times the wavelength, $\lambda$. Thus:

$$z = \frac{\Delta F \lambda S}{B}$$

For a base line $B = 200$:

$$z = \frac{\Delta F \lambda S}{100 \lambda}$$

As $z/S$ (FIGURE 2) is the sine of the angle $\epsilon$ which is measured between the direction of the missile and the zero plane:

$$\sin \epsilon = \frac{z}{S} = \frac{\Delta F}{200}$$

Therefore the sin $\epsilon$ is directly proportional to the total Beat-Beat count. The sensitivity of the system is directly proportional to the base line, B.

Turning again to FIGURE 1, there is shown a moving object 10 displaced relative to a reference course or zero line 12. Two receiving stations are located along a line perpendicular to the reference line and equal distance from the reference line. The receiving stations are adapted to detect a signal emitted from the moving object, which signal may be provided by means of a ground transmitter 14 transmitting a signal having a fixed frequency, to the moving object which may be changed in frequency, if desired, by the object and rebroadcast. By rebroadcasting a different frequency such as a multiple frequency, interference by direct reception by the receiving stations of the signal from the ground transmitter is avoided.

It will be observed that the Doppler effect, the shift in frequency due to velocity between transmitter and receiver, will result in a different amount of frequency shift for receiving antennas located at the two receiving stations unless the moving object stays on the reference line. By measuring the relative amounts of Doppler frequency shifts it is possible to determine the direction of the object relative to the receiver stations which may be considered together as a reference station.

Considering now in detail an embodiment of the invention, reference is made to FIGURE 3. Transmitter 14 produces a signal at a fixed, nonvarying frequency of ($f_t$) cycles per second. A missile or other moving object 10 contains a receiver which includes an amplifier-multiplier 13 for receiving and amplifying the signal ($f_t$), as modified by a first Doppler frequency ($f_d$), and for multiplying the frequency thereof by a typical factor of 2 and retransmitting the resultant signal as a reply signal at a frequency $2f_t-2f_d$ via a suitable transmitting antenna to the receiving stations.

The reply signal is received at the receiving stations by two receivers 16 and 18, again after a Doppler frequency shift, which will normally be, at least slightly, different for each received signal. Thus receiver 16 will receive the reply signal which includes a first additional Doppler component ($f_{d1}$) or a signal ($2f_t-2f_d-f_{d1}$) while receiver 18 will receive a reply signal which includes a second additional Doppler component ($f_{d2}$) or a signal $$(2f_t-2f_d-f_{d2})$$

Receivers 16 and 18 are connected to a local oscillator 19 which produces a reference frequency signal ($f_r$). This signal is mixed with each received signal in each receiver in conventional superheterodyne fashion to produce two output signals, $[2f_r-(2f_t-2f_d-f_{d1})]$ from receiver 16 and $[2f_r-(2f_t-2f_d-f_{d2})]$ from receiver 18. The difference between these signals is extracted by both modulators 20 and 22 and presented for visual observation or recordation as appropriate by a suitable indicator 24. A phase shifter 26 is connected in the signal path from receiver 16 to modulator 22 to provide a phase shift of 90° in the Doppler difference signal obtained by modulator 22 relative to the Doppler difference signal obtained by modulator 20. Thus the output of modulator 20 is $f_{d1}-f_{d2}$ and the output of modulator 22 is $f_{d1}-f_{d2}+90°$.

FIGURE 4 shows a schematic diagram particularly illustrating indicator 24 in FIGURE 3. Outputs from receivers 16 and 18 are applied to modulators 20 and 22, the output of receiver 16 being supplied to modulator 22 through phase shifter 26. The output of modulator 20 is fed to coil 32 of synchronous motor 34 and the output of modulator 22 is fed to coil 36 of motor 34. The rotor shaft of motor 34 is used to drive, through any desired gear arrangement, a visual indicator of object departure and, if desired, a data potentiometer 38. The potentiometer in turn will translate position information to analogous electrical voltages for recording or other uses. As illustrated, the potentiometer furnishes a signal voltage to recorder 40. Recorder 40 may be any recorder suitable for recording the applied signal such as a graphic recorder which will plot the magnitude of an input signal versus real time. In the present application the recorder could provide a diagram representative of the deviation from the desired trajectory of a body such as a missile during the entire time of flight, provided of course that signal contact is maintained.

As explained above, the magnitude of motor rotation is a measure of the angle of departure from a prescribed trajectory of the object being observed.

FIGURE 5 shows another type of indicator which may be used alone or together with the indicator shown in FIGURE 4. The output of one of the receivers (receiver 16, as illustrated) is connected directly to the x-axis of oscilloscope 42, and the same signal after passing through a 90° phase shifting network 26 is connected to the y-axis of oscilloscope 42. This will produce a circle on the screen. The output of the other receiver is converted by limiter-differentiator 44 to pulses of the same frequency which are used for intensity modulation or control of the oscilloscope beam and thus illuminating the circle only on one spot. If the missile or other body is on course the two signals will be synchronized in phase, and the dot will remain stationary. Deviations of the missile to the right will result in a clockwise rotation of the dot; deviations of the missile to the left will cause counterclockwise rotation.

It will be apparent from the foregoing that the invention is not limited to the specific details of parts and circuits shown and the following claims are intended to include those modifications and variations that are within the spirit and scope of my invention.

I claim:

1. A Doppler tracking system for tracking a moving object comprising: a ground transmitter for transmitting a signal of a first fixed frequency; means carried by said moving object for receiving said transmitted signal and for converting this signal to a second frequency which is a multiple of said first frequency, and for transmitting the frequency multiplied signal; first and second receiver stations each consisting of a single receiver for receiving signals from said moving object, said stations being positioned on a first line and being on opposite sides of and equal distances from a second line, said second line being perpendicular to said first line and defining the desired course of said moving object; and means responsive to the output signals of said receivers for obtaining the relative frequencies thereof whereby an indication of any deviation of said object from the desired course is obtained, said responsive means comprising a first modulator connected to said first and second receivers for providing a first beat frequency, a 90° phase shifting means connected to said first receiver, a second modulator connected to said phase shifting means and to said second receiver for providing a second beat frequency which is 90° out of phase with said first beat frequency, a synchronous motor connected to said first and second modulators, a potentiometer connected to and driven by said motor and a real time recorder connected to said potentiometer for providing a diagrammatic representation of any deviation of said moving object from the desired course.

2. A missile tracking system comprising: means for radiating a signal having a fixed frequency from a missile being tracked, ground located receiver means consisting of first and second receivers for receiving said radiated signal, means responsive to the outputs of said first and second receivers for obtaining the relative frequencies of said outputs, and recording means connected to said responsive means for providing a diagrammatic representation of any deviation of said missile from a desired course.

References Cited by the Examiner

UNITED STATES PATENTS

| | | | |
|---|---|---|---|
| 2,451,823 | 10/48 | Guanella | 343—104 |
| 2,582,971 | 1/52 | Dunmore | 343—11 |
| 3,064,929 | 11/62 | Gard | 343—15 X |
| 3,101,471 | 8/63 | Stavis | 343—108 X |
| 3,120,000 | 1/64 | Wilmotte | 343—113 |

CHESTER L. JUSTUS, *Primary Examiner.*